Patented Aug. 8, 1944

2,355,335

UNITED STATES PATENT OFFICE 2,355,335

PURIFICATION OF MERCAPTANS

Waldo L. Semon, Silver Lake, Ohio, assignor to The B. F. Goodrich Company, New York, N. Y., a corporation of New York No Drawing. Application January 29, 1943, Serial No. 473,974

5 Claims. (Cl. 260—609)

This invention relates to the purification of mercaptans, and especially to the separation of mercaptans from mixtures with the corresponding alcohols.

The preparation of reasonably pure mercaptans at a low cost ordinarily involves the conversion of an alcohol to a halide or sulfate (preferably a salt of an organic acid sulfate) which is then reacted with a hydrosulfide as by heating with an aqueous solution of sodium hydrosulfide. However, conversion of the alcohol to the halide or sulfate is generally incomplete, and separation of unreacted alcohol is often difficult, especially when higher alcohols are converted to soap-like acid sulfates. Furthermore, during the actual mercaptan-forming reaction, hydrolysis tends to occur with the regeneration of alcohol.

Consequently, mixtures of mercaptans with the corresponding alcohols are often encountered. Such mixtures are extremely difficult to separate, since the properties of the two classes are so nearly alike. Except for the very lowest members of the aliphatic series, the boiling points of mercaptans and of the corresponding alcohols differ by only a few degrees, so that separation by distillation is so difficult as to be impractical. Furthermore, solubilities and other physical properties of the two classes are so nearly alike that other physical methods such as extraction are likewise not useful.

I have found that mixtures of mercaptans with the corresponding alcohols are readily separated by esterifying the alcohol with boric acid and distilling off the unchanged mercaptan. The mercaptan is thus obtained in a state of high purity. The residue of borate in the still may then be hydrolyzed by simple treatment with hot water or steam, to regenerate alcohol and boric acid, which may then be reused.

This process is so simple and inexpensive that it permits partial conversion of alcohol to acid sulfate by simple esterification with sulfuric acid until a convenient equilibrium point is reached, neutralization with alkali, and conversion of the alkali salt of the acid sulfate to mercaptan by reaction with an aqueous solution of a hydrosulfide, to produce a mixture of mercaptan with a large proportion of unchanged alcohol, and ultimate separation of the alcohol for return to the reaction. Especially in the case of the higher alkyl mercaptans, separation of the alcohol at the end of the reaction by the process of this invention is so easy and inexpensive that it is uneconomical to attempt to remove unreacted alcohol at any earlier stage of the process.

The mercaptan (and the corresponding alcohol) may be any alkyl mercaptan of not too high a molecular weight to be distilled, or may even be an unsaturated or cyclic mercaptan. The process of this invention is most advantageous when applied to purification of higher alkyl mercaptans, meaning those containing an alkyl group with at least 8 carbon atoms, and especially a normal alkyl group containing from 10 to 16 carbon atoms such as are found in the alcohols obtained by hydrogenating natural fats or fatty acids.

The mixture of mercaptan and alcohol is readily esterified by heating with boric acid. The reaction may be hastened, if desired, by addition of a trace of strong acid such as hydrochloric acid. It is most convenient to employ just the quantity of boric acid needed to react with the alcohol present, each molecule of boric acid reacting with three molecules of the alcohol to form a substantially non-volatile borate. In the case of the higher alkyl compounds, the mixture of mercaptan and alcohol should be separated from any water (the mixture being an oily water-insoluble liquid) and heated with the boric acid until all the water produced by the esterification reaction is boiled off. This can most readily be accomplished by heating under a vacuum.

The mercaptan is then isolated by distillation, which can be carried on as a continuation of the removal of the water of esterification, either by increasing the temperature or decreasing the pressure. The mercaptan so obtained is exceptionally pure, and if the operation has been properly performed, will be found to be almost completely free from alcohol.

The borate remaining in the still is then heated with a quantity of water sufficient to dissolve its boric acid content. The ester rapidly hydrolyzes, regenerating the original alcohol, which forms a separate oily layer, and boric acid solution from which the boric acid may be isolated by evaporation of the water. These recovered materials can then be reused directly, or if desired after an intervening purification, such as redistillation of the alcohol.

As a specific example of one embodiment of the invention, I will describe the purification of lorol mercaptan. Lorol is a name commonly given to a mixture of alcohols produced by the hydrogenation of the fatty acids of coconut oil and consisting principally of dodecyl, tetradecyl and hexadecyl alcohols.

The lorol is esterified in a well known manner by mixing it with concentrated sulfuric acid, which converts about three-fifths of it to lorol hydrogen sulfate. The sulfatim mixture is neutralized with alkali and heated with an aqueous solution of sodium hydrosulfide until all the lorol sulfate is converted to lorol mercaptan. The product is secured as an oily liquid floating on the aqueous solution and is separated from the aqueous liquid.

The oily mixture so secured consists of about three parts of lorol mercaptan with about two parts of lorol which did not take part in the various reactions involved in the synthesis of the mercaptan. For every 100 lbs. of the mixture, 6.5 lbs. of boric acid is added and the mixture is then heated in a direct-fired vacuum still. After the water of esterification has all come over, the still is heated under a vacuum (about 12 mm. of mercury is a suitable pressure) to distill over the mercaptan, which requires a temperature of about 400° F. in the kettle. The product so secured tests practically 100% pure mercaptan.

The lorol borate remaining in the still is withdrawn to a tank where it is mixed with water and heated by blowing in steam. The borate soon hydrolyzes to regenerate lorol, which is skimmed off and redistilled in a vacuum for re-use, and boric acid solution, from which the acid is recovered by evaporation of the water.

It is manifest that many modifications of the foregoing procedure may be used. In particular, other substantially non-volatile weak inorganic acids may be used, especially polyfunctional acids such as arsenic acid and the like. Strong acids such as sulfuric and phosphoric are not recommended since they tend to cause some loss of alcohol by dehydration. However, boric acid is preferred, since it is innocuous non-oxidizing and cheap and functions very smoothly in the process.

I claim:

1. The process of separating a mercaptan from the corresponding alcohol, which comprises esterifying the alcohol with boric acid and separating the mercaptan from the ester by distillation.

2. The process of separating a higher alkyl mercaptan from the corresponding alcohol, which comprises esterifying the alcohol with boric acid and separating the higher alkyl mercaptan from the ester by distillation.

3. The process of separating a higher alkyl mercaptan from the corresponding alcohol, which comprises esterifying the alcohol with boric acid, separating the higher alkyl mercaptan from the ester by distillation, and regenerating the alcohol by hydrolysis of the ester.

4. The process of separating lorol mercaptan from lorol, which comprises esterifying the lorol with boric acid, separating the lorol mercaptan from the lorol borate by distillation, and regenerating the lorol by hydrolysis of the lorol borate.

5. The process of preparing pure lorol mercaptan from lorol, which comprises esterifying lorol with sulfuric acid, neutralizing with alkali and heating with a hydrosulfide solution to form a mixture of lorol mercaptan with unreacted lorol, esterifying the unreacted lorol with boric acid, separating the lorol mercaptan from the lorol borate by distillation, and regenerating the lorol by hydrolysis of the lorol borate.

WALDO L. SEMON.